United States Patent
Li et al.

(10) Patent No.: US 12,314,721 B2
(45) Date of Patent: May 27, 2025

(54) BRANCH PREDICTION METHOD, BRANCH PREDICTION APPARATUS, PROCESSOR, MEDIUM, AND DEVICE

(71) Applicant: TENCENT TECHNOLOGY (SHENZHEN) COMPANY LIMITED, Shenzhen (CN)

(72) Inventors: Dongsheng Li, Shenzhen (CN); Zimu Ren, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 13 days.

(21) Appl. No.: 18/339,024

(22) Filed: Jun. 21, 2023

(65) Prior Publication Data

US 2023/0350683 A1 Nov. 2, 2023

Related U.S. Application Data

(63) Continuation of application No. PCT/CN2022/134994, filed on Nov. 29, 2022.

(30) Foreign Application Priority Data

Mar. 2, 2022 (CN) .......................... 202210205048.0

(51) Int. Cl.
 G06F 9/38 (2018.01)
 G06F 9/30 (2018.01)
 G06F 9/32 (2018.01)

(52) U.S. Cl.
 CPC ........ G06F 9/3806 (2013.01); G06F 9/30069 (2013.01); G06F 9/30145 (2013.01); G06F 9/325 (2013.01); G06F 9/3844 (2013.01)

(58) Field of Classification Search
 None
 See application file for complete search history.

(56) References Cited

U.S. PATENT DOCUMENTS 5,706,491 A * 1/1998 McMahan ........... G06F 12/0864
  712/228
6,134,654 A * 10/2000 Patel ..................... G06F 9/3806
  712/240

(Continued)

FOREIGN PATENT DOCUMENTS

CN 106997286 A 8/2017
CN 109308191 A 2/2019

(Continued)

OTHER PUBLICATIONS

'Branch Prediction' 15-740 Spring'18, by Nathan Beckmann, 2018. (Year: 2018).*

(Continued)

Primary Examiner — Steven G Snyder
(74) Attorney, Agent, or Firm — ANOVA LAW GROUP PLLC

(57) ABSTRACT

A branch prediction method includes obtaining an instruction block containing an instruction, performing detection on the instruction block according to branch instruction information stored in a branch target buffer of a branch predictor of a processor, and in response to detecting that the instruction is a branch instruction, detecting a type of the branch instruction. The method further includes, in response to the type of the branch instruction being a type other than a target type, searching for a predicted jump address of the branch instruction in the branch target buffer, and, in response to the type of the branch instruction being the target type, searching for the predicted jump address of the branch instruction in other address areas of the branch predictor.

(Continued)

The target type includes at least one of a function call instruction type, a function return instruction type, or a loop instruction type.

18 Claims, 6 Drawing Sheets

(56) References Cited

U.S. PATENT DOCUMENTS

| | | | | |
|---|---|---|---|---|
| 6,314,514 | B1* | 11/2001 | McDonald | G06F 9/3842 |
| | | | | 712/E9.05 |
| 11,099,850 | B2* | 8/2021 | Orion | G06F 9/3806 |
| 11,586,944 | B2* | 2/2023 | Orion | G06F 12/0862 |
| 11,803,390 | B1* | 10/2023 | Bouzguarrou | G06F 9/30072 |
| 2002/0083310 | A1 | 6/2002 | Morris et al. | |
| 2009/0006826 | A1* | 1/2009 | Hu | G06F 9/3844 |
| | | | | 712/E9.047 |
| 2012/0124344 | A1 | 5/2012 | Jarvis | |
| 2014/0075156 | A1* | 3/2014 | Blasco-Allue | G06F 9/3804 |
| | | | | 712/205 |
| 2014/0331028 | A1* | 11/2014 | Demongeot | G06F 9/3806 |
| | | | | 712/205 |
| 2015/0082006 | A1* | 3/2015 | Ge | G06F 9/38 |
| | | | | 712/208 |
| 2015/0100762 | A1* | 4/2015 | Jacobs | G06F 9/3806 |
| | | | | 712/207 |
| 2016/0092230 | A1 | 3/2016 | Chen et al. | |
| 2019/0384612 | A1 | 12/2019 | Evers et al. | |
| 2020/0034151 | A1 | 1/2020 | Thyagarajan et al. | |
| 2020/0050458 | A1* | 2/2020 | Bouzguarrou | G06F 9/3848 |
| 2020/0065111 | A1* | 2/2020 | Bouzguarrou | G06F 9/3806 |
| 2020/0081717 | A1 | 3/2020 | Orion et al. | |
| 2020/0082280 | A1 | 3/2020 | Orion et al. | |
| 2023/0120596 | A1* | 4/2023 | Pusdesris | G06F 9/3844 |
| | | | | 712/208 |

FOREIGN PATENT DOCUMENTS

| | | |
|---|---|---|
| CN | 111258649 A | 6/2020 |
| CN | 112368677 A | 2/2021 |
| CN | 112470122 A | 3/2021 |
| CN | 115495155 A | 12/2022 |

OTHER PUBLICATIONS

'Loop Termination Prediction' by Timothy Sherwood et al., in Proceedings of the 3rd International Symposium on High Performance Computing (ISHPC2K), Oct. 2000. (Year: 2000).*

The State Intellectual Property Office of the People's Republic of China (SIPO) Office Action 1 for 202210205048.0 May 15, 2024 12 Pages (including translation).

The World Intellectual Property Organization (WIPO) International Search Report for PCT/CN2022/134994 Feb. 15, 2023 11 Pages (including translation).

Liao H, Tu J, Xia J, et al. Davinci: A scalable architecture for neural network computing[C]//2019 IEEE Hot Chips 31 Symposium (HCS). IEEE Computer Society, 2019: 1-44.

* cited by examiner

| 301 | 302 | 304 | 303 |
|---|---|---|---|
| Branch instruction identification information | Type of branch instruction | Whether to jump | Predicted jump address |

| 501 | 502 | 503 | 504 |
|---|---|---|---|
| Loop instruction identification information | Total number of loops | Number of loops | Loop start address |

| Significant bit | Label | Branch type | Whether to jump | Predicted jump address |
|---|---|---|---|---|
| | | | | |

| Significant bit | Label | Total number of loops | Current number of loops | Loop start address |
|---|---|---|---|---|
| | | | | |

BRANCH PREDICTION METHOD, BRANCH PREDICTION APPARATUS, PROCESSOR, MEDIUM, AND DEVICE

CROSS-REFERENCE TO RELATED APPLICATIONS

This application is a continuation of International Application No. PCT/CN2022/134994, filed on Nov. 29, 2022, which claims priority to Chinese Patent Application No. 202210205048.0, entitled "BRANCH PREDICTION METHOD, BRANCH PREDICTION APPARATUS, PROCESSOR, MEDIUM, AND DEVICE" filed with the Chinese Patent Office on Mar. 2, 2022, which are incorporated by reference in their entirety.

FIELD OF THE TECHNOLOGY

This application relates to the field of computer and communication technologies, in particular to a branch prediction method, a branch prediction apparatus, a processor, a medium, and a device.

BACKGROUND OF THE DISCLOSURE

A branch instruction is an instruction in a computer program that may cause a computer to execute different instruction sequences, thereby deviating from the default behavior of sequentially executing instructions. In the design of a processor, if a branch predictor is not included, the performance of the processor will be impacted. However, current artificial intelligence (AI) processors and shallow pipeline general-purpose processors generally do not have corresponding branch predictors, which may reduce the processing performance of the AI processors and shallow pipeline general-purpose processors, and affect the efficiency of the processors in executing instructions.

SUMMARY

In accordance with the disclosure, there is provided a branch prediction method including obtaining an instruction block containing an instruction, performing detection on the instruction block according to branch instruction information stored in a branch target buffer of a branch predictor of a processor, and in response to detecting that the instruction contained in the instruction block is a branch instruction, detecting a type of the branch instruction. The method further includes searching for a predicted jump address of the branch instruction according to the type of the branch instruction, including, in response to the type of the branch instruction being a type other than a target type, searching for the predicted jump address of the branch instruction in the branch target buffer, and, in response to the type of the branch instruction being the target type, searching for the predicted jump address of the branch instruction in other address areas of the branch predictor. The target type includes at least one of a function call instruction type, a function return instruction type, or a loop instruction type.

Also in accordance with the disclosure, there is provided a branch predictor arranged in a processor and configured to implement the above branch prediction method.

Also in accordance with the disclosure, there is provided a processor including the above branch predictor, a multiplexer, an instruction cache unit, an instruction decoding unit, and an instruction execution unit. A first input end of the multiplexer is connected to an output end of the branch predictor, a second input end of the multiplexer is a sequential instruction fetch end, and an output end of the multiplexer is connected to an input end of the branch predictor. The multiplexer is configured to output the predicted jump address in response to the first input end receiving the predicted jump address, and output an instruction address received at the second input end in response to the first input end not receiving the predicted jump address. An input end of the instruction cache unit is connected to the output end of the multiplexer, and the instruction cache unit is configured to obtain corresponding instruction information according to an address outputted by the multiplexer. The instruction decoding unit is connected to the instruction cache unit and configured to decode the instruction information obtained by the instruction cache unit to obtain a control signal. The instruction execution unit is connected to the instruction decoding unit and configured to execute a corresponding operation according to the control signal.

Also in accordance with the disclosure, there is provided a non-transitory computer-readable medium storing a computer program that, when executed by one or more processors, causes the one or more processors to obtain an instruction block containing an instruction, perform detection on the instruction block according to branch instruction information stored in a branch target buffer of a branch predictor, and in response to detecting that the instruction contained in the instruction block is a branch instruction, detect a type of the branch instruction. The computer program further causes the one or more processors to search for a predicted jump address of the branch instruction according to the type of the branch instruction, including, in response to the type of the branch instruction being a type other than a target type, searching for the predicted jump address of the branch instruction in the branch target buffer, and in response to the type of the branch instruction being the target type, searching for the predicted jump address of the branch instruction in other address areas of the branch predictor. The target type includes at least one of a function call instruction type, a function return instruction type, or a loop instruction type.

Also in accordance with the disclosure, there is provided an electronic device including one or more processors and a storage apparatus storing one or more programs that, when executed by the one or more processors, cause the one or more processors to obtain an instruction block containing an instruction, perform detection on the instruction block according to branch instruction information stored in a branch target buffer of a branch predictor, and in response to detecting that the instruction contained in the instruction block is a branch instruction, detect a type of the branch instruction. The one or more programs further cause the one or more processors to search for a predicted jump address of the branch instruction according to the type of the branch instruction, including, in response to the type of the branch instruction being a type other than a target type, searching for the predicted jump address of the branch instruction in the branch target buffer, and in response to the type of the branch instruction being the target type, searching for the predicted jump address of the branch instruction in other address areas of the branch predictor. The target type includes at least one of a function call instruction type, a function return instruction type, or a loop instruction type.

DESCRIPTION OF EMBODIMENTS

Figure 1:
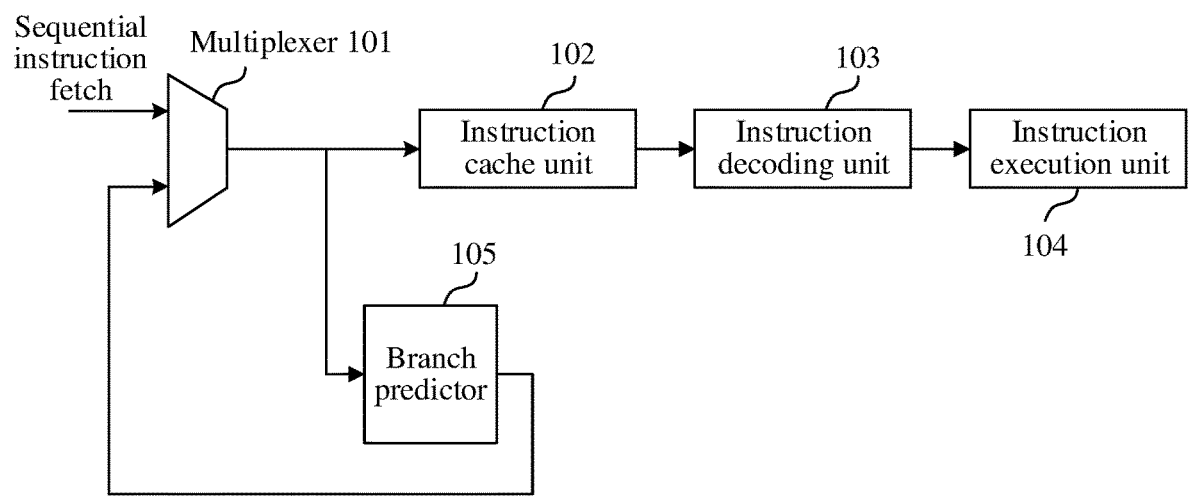
FIG. 1 shows an architecture diagram of a processing apparatus according to an embodiment of this application.

It is to be understood that "a plurality of" mentioned in the specification means two or more. "And/or" describes an association relationship between associated objects and represents that three relationships may exist. For example, A and/or B may represent the following three cases: only A exists, both A and B exist, and only B exists. The character "/" generally indicates an "or" relationship between the associated objects.

The instruction sequence of a computer program may include various branch instructions, such as a conditional jump instruction. The branch instruction is an instruction in the computer program that may cause a computer to execute different instruction sequences, thereby deviating from the default behavior of sequentially executing instructions.

According to statistics, on average, every seven instructions include a branch instruction, and in an instruction pipeline structure, it is quite sensitive to branch instructions. Assuming that the first instruction in the instruction pipeline is in a decoding stage and the second instruction is in a fetching stage (that is, ready to enter a decoder), if the first instruction is found to be a branch instruction (such as jumping to a certain address), the prefetching of the next and subsequent instructions in an instruction prefetching queue is invalid. During execution of the first instruction, a branch target address is formed, and then, the instruction needs to be fetched from the target address and delivered for execution. At the same time, the instruction prefetching queue needs to be immediately cleared, and then, the instruction after the target address is prefetched and filled in the instruction prefetching queue. This mode is called pipeline stalled, pipeline bubbling, or branch delay slot. Of course, this also indicates that once a branch instruction is encountered, the entire instruction pipeline is disrupted once and may only be restored to normal later, which obviously affects the running speed of a machine.

A branch predictor may improve the process in the instruction pipeline. As described above, in the absence of branch prediction, a processor needs to wait for a branch instruction (such as a conditional jump instruction) to pass the execution stage before the next instruction enters the fetching stage, which causes pipeline bubbles, wastes the processing cycle, and reduces the use efficiency of the processor, thus reducing the efficiency of the processor in executing instructions. Pipeline bubbles refer to the occurrence of bubbles when certain conditions do not allow the instruction pipeline to continue running and the instruction pipeline needs to stop. The branch predictor may avoid such waiting by predicting whether the branch may jump, thereby avoiding pipeline bubbles. The branch predictor judges an unexecuted branch; if it is judged not to jump, the processor continues fetching; and if it is judged to jump, the branch predictor returns to the predicted jump address so as to cause the processor to continue fetching from the predicted jump address. That is to say, the processor fetches the instruction at the most probable branch as a predicted instruction, and one or more instructions starting from the predicted instruction are speculatively executed. If the processor later detects a branch prediction error, the pipeline is flushed (that is, pipeline flush), and the pipeline is restarted according to correct instructions. Visually, in the design of the processor, if the branch predictor is not added or the prediction accuracy of the branch predictor is not high, it will have a significant impact on the performance of the processor. Currently, AI processors and shallow pipeline general-purpose processors generally do not have corresponding branch predictors, and the main reason for not designing the branch predictors is because it is considered that the stall and flush of shallow pipelines are tolerated. In addition, there are certain differences between the instruction sets of AI processors and the instruction sets of general-purpose superscalar processors. Therefore, for AI processors and shallow pipeline general-purpose processors, even if branch prediction is performed in related technologies, the branch prediction is often very simple and needs to be highly coupled with the own instruction set. Therefore, this application aims to provide a branch predictor for AI processors and shallow pipeline general-purpose processors. The branch predictor may comprehensively predict the predicted jump addresses of various types of branch instructions, so that the processor reduces the probability of pipeline bubbles in the instruction pipeline by the predicted jump addresses, thereby improving the use efficiency of the processor, and improving the efficiency of the processor in executing instructions.

The biggest advantage of the AI processor chip mentioned above lies in AI. After the deep learning ability of AI is introduced, intelligent allocation of internal resources of a system may be achieved, and perception, reasoning and decision-making functions are provided. AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making. The AI technology is a comprehensive discipline, and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, machine learning/deep learning, automatic driving, and intelligent transportation.

In the applications of AI processor and shallow pipeline general-purpose processor chips, branch instructions account for nearly a quarter of total running instructions. Therefore, there is a need to design a branch predictor to reduce the pipeline stall or flush caused by branch instructions. Therefore, an embodiment of this application provides a branch prediction solution applied to a processor, which may improve the performance efficiency of the processor.

Specifically, as shown in FIG. 1, in an embodiment of this application, a system architecture of a processing apparatus (such as a processor) 100 may include a multiplexer 101, an instruction cache unit 102, an instruction decoding unit 103, an instruction execution unit 104, and a branch predictor 105.

The first input end of the multiplexer 101 is connected to the output end of the branch predictor 105, the second input end of the multiplexer 101 is a sequential instruction fetch end, and the output end of the multiplexer 101 is connected to the input end of the instruction cache unit 102 and the input end of the branch predictor 105. The output end of the instruction cache unit 102 is connected to the input end of the instruction decoding unit 103, and the output end of the instruction decoding unit 103 is connected to the input end of the instruction execution unit 104.

In some embodiments, the branch predictor 105 contains a branch target buffer. After the branch predictor 105 obtains an instruction block to be processed (the instruction block to be processed is an instruction block outputted by the multiplexer 101), whether the instruction block to be processed contains a branch instruction may be detected according to the branch instruction information stored in the branch target buffer. When it is detected that the instruction block to be processed contains a branch instruction, the type of the branch instruction may be detected. Thus, if the type of the branch instruction is another type other than a target type, a predicted jump address of the branch instruction is searched for in the branch target buffer, where the target type includes at least one of the following: a function call instruction, a function return instruction and a loop instruction; and if the type of the branch instruction is the foregoing target type, a predicted jump address of the branch instruction is searched for in other address areas (such as an address stack for return address and a loop buffer) of the branch predictor.

Specifically, if the type of the branch instruction is a function call instruction, the called function address is pushed into the address stack. If the type of the branch instruction is a function return instruction, the function address pushed into the address stack is popped up as the predicted jump address.

If the type of the branch instruction is a loop instruction, the number of executed loops and total number of loops of the loop instruction are obtained according to the loop instruction information stored in the loop buffer. If the number of executed loops of the loop instruction is equal to the total number of loops, then for the loop instruction, it is predicted to jump out of the loop; and if the number of executed loops of the loop instruction is not equal to the total number of loops, a loop start address corresponding to the loop instruction is used as the predicted jump address.

In some embodiments, the multiplexer 101 may output the predicted jump address when the first input end inputs a predicted jump address, and output an instruction address inputted by the second input end (that is, the instruction address obtained in sequence) when the first input end does not input a predicted jump address.

The instruction cache unit 102 is configured to obtain corresponding instruction information according to the address outputted by the multiplexer 101; the instruction decoding unit 103 is configured to decode the instruction information obtained by the instruction cache unit 102 to obtain a control signal; and the instruction execution unit 104 is configured to execute the corresponding operation according to the control signal obtained by the instruction decoding unit 103.

Since the branch predictor 105 may achieve the prediction of the predicted jump address for various types of branch instructions, full coverage of the types of branch instructions is achieved. Therefore, the technical solutions in the embodiments of this application may improve the efficiency of the processor in executing instructions.

The implementation details of the technical solutions in the embodiments of this application are described in detail below.

Figure 2:
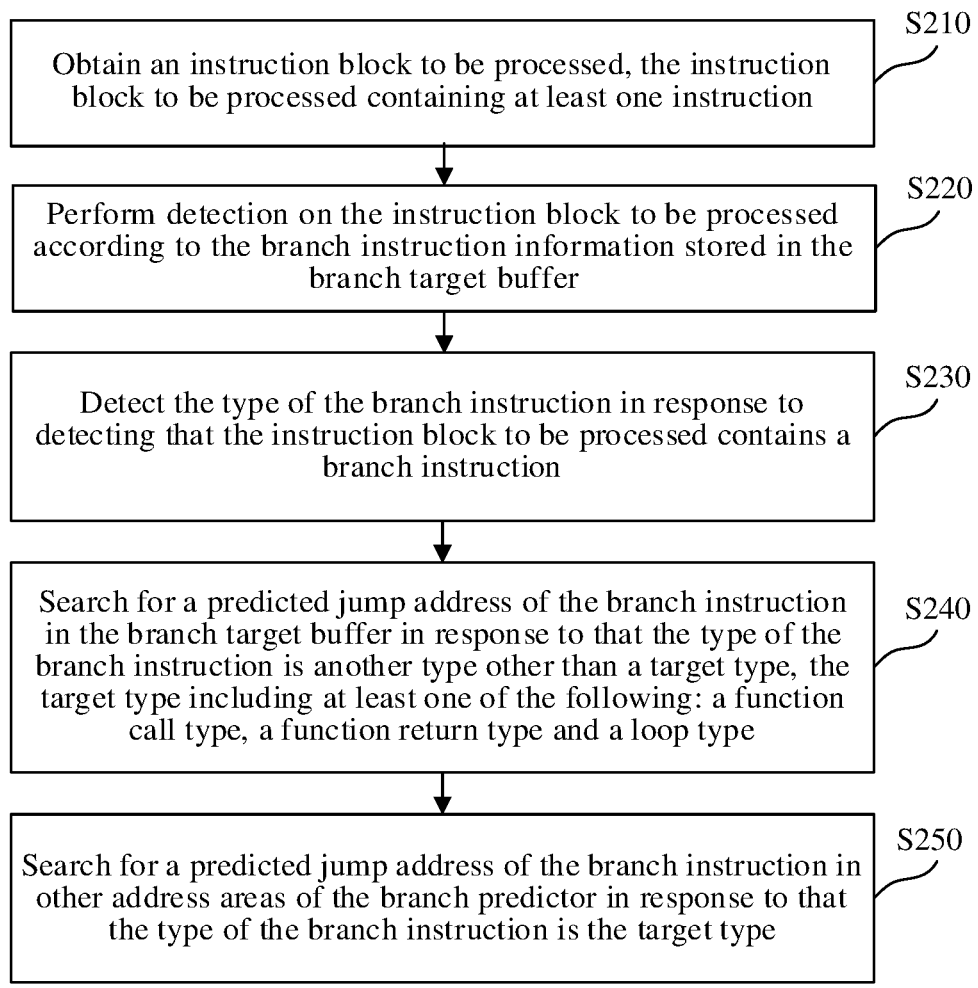
FIG. 2 shows a flowchart of a branch prediction method for a processor according to an embodiment of this application.

FIG. 2 shows a flowchart of a branch prediction method for a processor according to an embodiment of this application. The branch prediction method for a processor may be performed by a branch predictor, such as the branch predictor 105 shown in FIG. 1. The branch predictor contains a branch target buffer for storing branch instruction information. Referring to FIG. 2, the branch prediction method for a processor at least includes the following step S210 to step S240:

Step S210: Obtain an instruction block to be processed, the instruction block to be processed containing at least one instruction.

Step S220: Perform detection on the instruction block to be processed according to the branch instruction information stored in the branch target buffer.

Step S230: Detect the type of the branch instruction in response to detecting that the instruction block to be processed contains a branch instruction.

Step S240: Search for a predicted jump address of the branch instruction in the branch target buffer in response to that the type of the branch instruction is another type other than a target type, the target type including at least one of the following: a function call instruction type, a function return instruction type and a loop instruction type.

Step S250: Search for a predicted jump address of the branch instruction in other address areas of the branch predictor in response to that the type of the branch instruction is the target type.

The implementation details of each step shown in FIG. 2 are described in detail below.

In step S210, an instruction block to be processed is obtained, and the instruction block to be processed contains at least one instruction.

In some embodiments, a branch processor obtains an instruction block outputted by a multiplexer. The instruction block to be processed may be an instruction block that needs to be fetched for execution. The instruction block to be processed may be identified by the address of the first instruction in the instruction block as a label, and the number of instructions contained in an instruction block is usually determined, such as 1, 2, 4, 8, 16, 32, or the like.

In some embodiments, the instructions contained in the instruction block to be processed may be sequentially executed instructions or branch instructions, and the branch instructions may cause a computer to execute different instruction sequences, thereby deviating from the default behavior of sequentially executing instructions.

In step S220, the instruction block to be processed is detected according to the branch instruction information stored in the branch target buffer.

In step S230, the type of the branch instruction is detected in response to that it is detected that the instruction block to be processed contains a branch instruction.

In some embodiments, after the instruction block to be processed is obtained, the foregoing branch prediction method for a processor further includes: obtain the identification information of the instruction contained in the instruction block to be processed, and obtain the branch instruction identification information contained in the branch target buffer; and match the identification information of the contained instruction against the contained branch instruction identification information to determine whether the instruction block to be processed contains a branch instruction and the type of the contained branch instruction.

Figures 3, 4, 5:
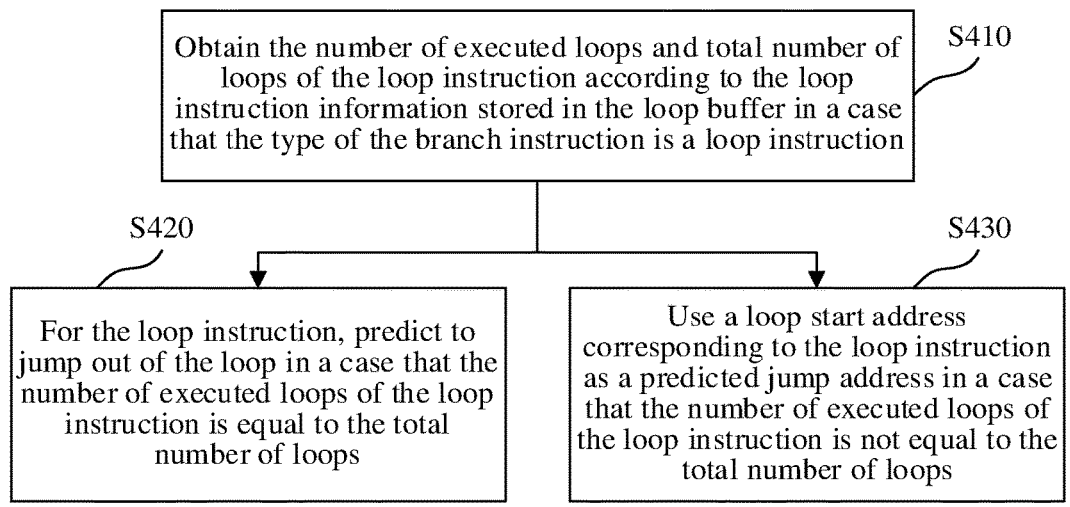
FIG. 3 shows a schematic diagram showing branch instruction information contained in a branch target buffer according to an embodiment of this application.
FIG. 4 shows a flowchart of determining a predicted jump address of a loop instruction according to an embodiment of this application.
FIG. 5 shows a schematic diagram showing loop instruction information contained in a loop buffer according to an embodiment of this application.

The branch target buffer contains at least one piece of branch instruction information. As shown in FIG. 3, each piece of branch instruction information includes branch instruction identification information 301, the type 302 of a branch instruction, and a predicted jump address 303 of the branch instruction. The branch instruction identification information 301 is used for identifying a branch instruction, and may be the address of the branch instruction. For example, the branch instruction identification information may be represented by a binary number with a set number of bits. The type of a branch instruction is used for representing the type of the branch instruction. For example, the type of a branch instruction is used for representing whether the branch instruction is a function call instruction, a function return instruction, a loop instruction, or other types of instructions. Exemplarily, when the type of the branch instruction recorded in the branch instruction information is "0", it represents a conditional jump type; and when the type of the branch instruction recorded in the branch instruction information is "1", it represents a loop type. The predicted jump address 303 is used for representing a jump address obtained by prediction for a branch instruction, and specifically may be represented by a binary number with a set number of bits.

Based on the branch instruction information shown in FIG. 3, when detecting whether the instruction block to be processed contains a branch instruction, the branch predictor may match the identification information of the instruction contained in the instruction block to be processed against the branch instruction identification information contained in the branch target buffer. If the branch instruction identification information may be matched, it may be determined that the instruction block to be processed contains a branch instruction, and the type of the branch instruction may be determined according to the branch instruction information shown in FIG. 3. The identification information of an instruction refers to the information that identifies an instruction. For example, the identification information of an instruction is the address of the instruction. In some embodiments, the branch instruction information stored in the branch target buffer may be obtained by means of machine learning. For example, during the execution of an instruction by a processor, a branch instruction is identified according to the execution result of the instruction and the features of the instruction, and then, the identified branch instruction is stored in the branch target buffer, so that the branch predictor is capable of detecting whether the instruction block contains a branch instruction.

In the foregoing embodiment, since whether the instruction block to be processed contains a branch instruction may be determined and the type of the contained branch instruction may be determined only by matching the instruction in the instruction block to be processed against the branch instruction information in the branch target buffer, the determination efficiency of the branch instruction and the determination efficiency of the type of the branch instruction are improved.

In some embodiments, the branch instruction information includes the type of a branch instruction. The step of matching the identification information of the contained instruction against the contained branch instruction identification information to determine whether the instruction block to be processed contains a branch instruction and the type of the contained branch instruction includes: match the identification information of the instruction in the instruction block to be processed against the branch instruction identification information contained in the branch target buffer; determine that the instruction is a branch instruction in response to that the branch target buffer contains target branch instruction identification information matching the identification information of the instruction; and obtain target branch instruction information including the target branch instruction identification information in the branch target buffer, and determine the type of the branch instruction according to the type of the branch instruction contained in the target branch instruction information.

Exemplarily, for an instruction A in the instruction block to be processed, the branch predictor may match the identification information of the instruction A against the branch instruction identification information contained in the branch target buffer, and if the matching is successful, it may be considered that the instruction A is a branch instruction. When the instruction A is determined to be a branch instruction, the branch predictor may fetch the type of the branch instruction from the target branch instruction information in the branch target buffer, and use the fetched type of the branch instruction as the type of the instruction A. The instruction A is any instruction in the instruction block to be processed. The target branch instruction information is the branch instruction information with the identification information of the instruction A.

In the foregoing embodiment, since the identification information may be considered as the information that uniquely identifies an instruction, by matching the identification information of the instruction against the branch instruction identification information, whether the instruction block to be processed contains a branch instruction may be accurately determined based on the matching result; and when it is determined that the instruction block to be processed contains a branch instruction, the type of the branch instruction may be determined, thereby improving the determination accuracy of the branch instruction.

In some embodiments, after the instruction block to be processed is obtained, the foregoing branch prediction method for a processor further includes: detect whether the branch instruction needs to jump according to the branch instruction information stored in the branch target buffer in response to that it is detected that the instruction block to be processed contains a branch instruction according to the branch instruction information stored in the branch target buffer; and perform the operation of searching for a predicted jump address of the branch instruction in response to that it is detected that the branch instruction needs to jump.

If it is detected that the instruction block to be processed contains a branch instruction according to the branch instruction information stored in the branch target buffer, the branch predictor may further detect whether the branch instruction needs to jump according to the branch instruction information stored in the branch target buffer. If it is detected that the branch instruction needs to jump, the process of searching for a predicted jump address of the branch instruction described in the following embodiments may be executed.

In some embodiments, referring to FIG. 3, in addition to including the branch instruction identification information 301, the type 302 of a branch instruction and a predicted jump address 303 of the branch instruction, each piece of branch instruction information may further contain a field 304 of whether to jump, so that whether the branch instruction needs to jump may be determined based on the value of the field 304. For example, in the foregoing example, if the value of the field of "whether to jump" in the target branch instruction information is "Yes", it indicates that the instruction A in the instruction block to be processed needs to jump, thus the branch predictor determines the predicted jump address through a solution corresponding to the type of the instruction A.

In the foregoing embodiment, whether the branch instruction needs to jump may be determined only by querying the branch target buffer, thereby improving the determination efficiency of determining whether the branch instruction needs to jump.

Continuing to refer to FIG. 2, in step S240, if the type of the branch instruction is another type other than a target type, a predicted jump address of the branch instruction is searched for in the branch target buffer. The target type includes at least one of the following: a function call instruction type, a function return instruction type and a loop instruction type.

When the type of the instruction is a function call type, the instruction may be referred to as a function call instruction; when the type of the instruction is a function return type, the instruction may be referred to as a function return instruction; and when the type of the instruction is a loop type, the instruction may be referred to as a loop instruction.

In some embodiments, other types may include a conditional jump type, and the like. In the embodiments of this application, if the type of the branch instruction is another type other than the target type, the branch predictor may query the predicted jump address 303 based on the branch instruction information shown in FIG. 3. For example, in the foregoing example, if it is determined that the type of the instruction A is not the target type based on the target branch instruction information, the branch predictor fetches the predicted jump address of the branch instruction from the target branch instruction information, and uses the fetched predicted jump address as the predicted jump address of the instruction A.

Continuing to refer to FIG. 2, in step S250, if the type of the branch instruction is the target type, a predicted jump address of the branch instruction is searched for in other address areas of the branch predictor, where the other address areas are different from the branch target buffer.

It is to be understood that the execution sequence of the steps shown in FIG. 2 is only illustrative. In other embodiments of this application, the execution sequence of specific steps may be adjusted. For example, as shown in FIG. 2, step S240 may be performed first, and then, step S250 is performed; or, step S250 may be performed first, and then, step S240 is performed; or, step S240 and step S250 may be performed at the same time.

In the technical solutions provided by some embodiments of this application, when it is detected that the instruction block to be processed contains a branch instruction according to the branch instruction information stored in the branch target buffer, the type of the branch instruction is detected. When the type of the branch instruction is another type other than a target type, a predicted jump address of the branch instruction is searched for in the branch target buffer. The target type includes at least one of the following: a function call instruction, a function return instruction and a loop instruction. When the type of the branch instruction is the target type, a predicted jump address of the branch instruction is searched for in other address areas of the branch predictor. As a result, the prediction of the predicted jump address may be achieved for various types of branch instructions, and full coverage of the types of branch instructions is achieved, thereby improving the efficiency of the processor in executing instructions.

In some embodiments, the other address areas include an address stack for return address, and the target type includes a function call type and a function return type. The step of searching for a predicted jump address of the branch instruction in other address areas of the branch predictor includes: push the function address called by the branch instruction into the address stack in response to that the type of the branch instruction is a function call type; and pop up the function address pushed into the address stack as the predicted jump address in response to that the type of the branch instruction is a function return type.

The other address areas may include an address stack for return address, and the target type includes a function call instruction and a function return instruction. In this case, if the type of the branch instruction is a function call instruction, the called function address may be pushed into the address stack; and if the type of the branch instruction is a function return instruction, the function address pushed into the address stack is popped up as the predicted jump address.

Since the function call instruction and the function return instruction usually appear in pairs, as long as the instructions are executed normally, the call and return of the functions thereof will appear in pairs. Therefore, higher prediction accuracy may be provided, and a jump address may be quickly predicted for the function return instruction.

In the foregoing embodiment, since the address stack is a stack architecture of last in first out (LIFO), which may be configured to store the function return address, the predicted jump address of the function return instruction stored in the address stack is an accurate jump address. As a result, the determined predicted jump address is more accurate. In some embodiments, the other address areas include a loop buffer for storing loop instruction information, and the target type may include a loop instruction. In this case, the process of determining a predicted jump address of a branch instruction with a loop instruction type may refer to FIG. 4, including the following steps:

Step S410: Obtain the number of executed loops and total number of loops of the branch instruction according to the loop instruction information stored in the loop buffer in response to that the type of the branch instruction is a loop instruction type.

In some embodiments, the loop buffer contains at least one piece of loop instruction information. As shown in FIG. 5, each piece of loop instruction information includes loop instruction identification information 501, a total number of loops 502, a number of executed loops 503 and a loop start address 504, where the loop instruction identification information 501 is used for identifying a loop instruction and may be the address of an instruction, and specifically may be represented by a binary number with a set number of bits; the total number of loops 502 is used for representing the total number of loops of a loop body corresponding to a loop instruction, and specifically may be represented by a binary number with a set number of bits; the number of executed loops 503 is used for representing the number of executed loops of a loop body corresponding to a loop instruction, and specifically may be represented by a binary number with a set number of bits; and the loop start address 504 is used for representing the address of the first instruction in a loop body, and specifically may be represented by a binary number with a set number of bits.

If the type of a branch instruction is a loop instruction type, the branch predictor determines a loop buffer and queries the number of executed loops and total number of loops of the branch instruction from the loop buffer.

In some embodiments, the loop buffer contains at least one piece of loop instruction information, and the loop instruction information includes loop instruction identification information, a total number of loops and a number of executed loops. The step of obtaining the number of executed loops and total number of loops of the branch instruction according to the loop instruction information stored in the loop buffer in response to that the type of the branch instruction is a loop type includes: fetch a specified instruction in a loop body corresponding to the branch instruction; match identification information of the specified instruction against the loop instruction identification information in the loop buffer to determine target loop instruction information matching the identification information of the specified instruction in the loop buffer; and query the number of executed loops and total number of loops of the branch instruction according to the target loop instruction information.

Based on the loop instruction information shown in FIG. 5, when the number of executed loops and total number of loops of the branch instruction are obtained, the branch predictor may fetch the specified instruction in the loop body corresponding to the branch instruction, and then match the identification information of the specified instruction against the loop instruction identification information in the loop buffer to match the target loop instruction information matching the identification information of the specified instruction, and then, the number of executed loops and total number of loops of the branch instruction may be queried according to the target loop instruction information matching the identification information of the specified instruction shown in FIG. 5.

In some embodiments, the loop instruction information stored in the loop buffer may be obtained by means of machine learning. For example, during the execution of an instruction by a processor, a loop instruction is identified according to the execution result of the instruction and the features of the instruction, and then, the information of the identified loop instruction is stored in the loop buffer, so that the branch predictor is capable of obtaining the information of the loop instruction. In some embodiments, if special loop instructions are designed in an instruction set architecture (ISA) and the total number of loops is given, the prediction accuracy of the loop buffer may reach 100%.

In the foregoing embodiment, since the loop buffer is a component for specifically predicting whether a loop needs to terminate or continue, the accurate number of executed loops and total number of loops may be fetched from the loop buffer, so as to improve the accuracy of the predicted jump address based on the accurately determined number of executed loops and total number of loops.

In some embodiments, the specified instruction includes an instruction at a specified position in the loop body.

For example, the specified instruction may be the last instruction, the second last instruction, or the like in the loop body.

In some embodiments, fetching the specified instruction in the loop body corresponding to the loop instruction may be fetching the last instruction in the loop body, of course, may also be fetching the other instructions in the loop body.

In the foregoing embodiment, when the last instruction in the loop body is executed, it may be considered that a loop ends. As a result, the last instruction in the loop body may be represented as the entire loop body, thereby storing the address part of the last instruction in the loop body as the loop instruction identification information in the loop buffer. Thus, when it is necessary to determine the number of executed loops and total number of loops of the branch instruction subsequently, the last instruction in the loop body may be used as the specified instruction, and the identification information of the specified instruction may be matched against the loop instruction identification information in the loop buffer, so as to achieve the purpose of determining the number of executed loops and the total number of loops based on the matching result.

Step S420: For the loop instruction, predict to jump out of the loop in response to that the number of executed loops of the loop instruction is equal to the total number of loops.

It is to be understood that if the number of executed loops of the loop instruction is equal to the total number of loops, it indicates that the loop body corresponding to the loop instruction completes the loop process. At this time, the loop may terminate, and the instructions following the loop instruction may be executed in sequence.

Step S430: Use a loop start address corresponding to the loop instruction as a predicted jump address in response to that the number of executed loops of the loop instruction is not equal to the total number of loops.

It is to be understood that if the number of executed loops of the loop instruction is not equal to the total number of loops, it indicates that the loop body corresponding to the loop instruction does not complete the loop process. At this time, the loop instruction needs to jump to the loop start address to continue the loop, so the loop start address corresponding to the loop instruction may be used as a predicted jump address.

In an embodiment of this application, the foregoing method further includes: increase the number of executed loops of the target loop instruction information by a set value in response to that the number of executed loops of the loop instruction is not equal to the total number of loops.

If the number of executed loops of the loop instruction is not equal to the total number of loops, it indicates that the loop body corresponding to the loop instruction does not complete the loop process. At this time, the loop instruction needs to jump to the loop start address to continue the loop. In this case, the number of executed loops of the loop instruction information matching the identification information of the specified instruction in the loop buffer may be increased by a set value. That is, the number of executed loops of the target loop instruction information is increased by a set value. For example, the number of executed loops 503 shown in FIG. 5 may be increased by 1.

In some embodiments, the prediction process of the branch prediction method and the instruction fetch process of the processor are in a same clock cycle.

In the embodiments of this application, the prediction process of the branch prediction method and the instruction fetch process of the processor are in a same clock cycle, thereby avoiding the problem of pipeline flush caused by prediction, being favorable for achieving the prediction effect of "zero bubble" of pipelines, and improving the processing efficiency of the processor.

In an embodiment, the foregoing method further includes: use a predicted jump address of the branch instruction as a start address of the next instruction block to be processed in response to that it is detected that the instruction block to be processed contains a branch instruction according to the branch instruction information stored in the branch target buffer.

In the embodiments of this application, as described above, the instruction block to be processed in step S210 may be an instruction block that needs to be fetched for execution. Therefore, if it is detected that the instruction block to be processed contains a branch instruction according to the branch instruction information stored in the branch target buffer, the processor uses the predicted jump address of the branch instruction as the start address of the next instruction block to be processed, so as to continue to execute the branch detection solution in the embodiments of this application.

In an embodiment, the foregoing method further includes: use a sequential address after the last instruction address of the instruction block to be processed as a start address of the next instruction block to be processed in response to that it is detected that the instruction block to be processed does not contain a branch instruction according to the branch instruction information stored in the branch target buffer.

If it is detected that the instruction block to be processed does not contain a branch instruction according to the branch instruction information stored in the branch target buffer, the processor uses a sequential address after the last instruction address of the instruction block to be processed as a start address of the next instruction block to be processed, so as to continue to execute the branch detection solution in the embodiments of this application. Visually, the technical solutions in the embodiments of this application may achieve the prediction of the predicted jump address for various types of branch instructions, and full coverage of the types of branch instructions is achieved, thereby improving the efficiency of the processor in executing instructions.

Figure 6:
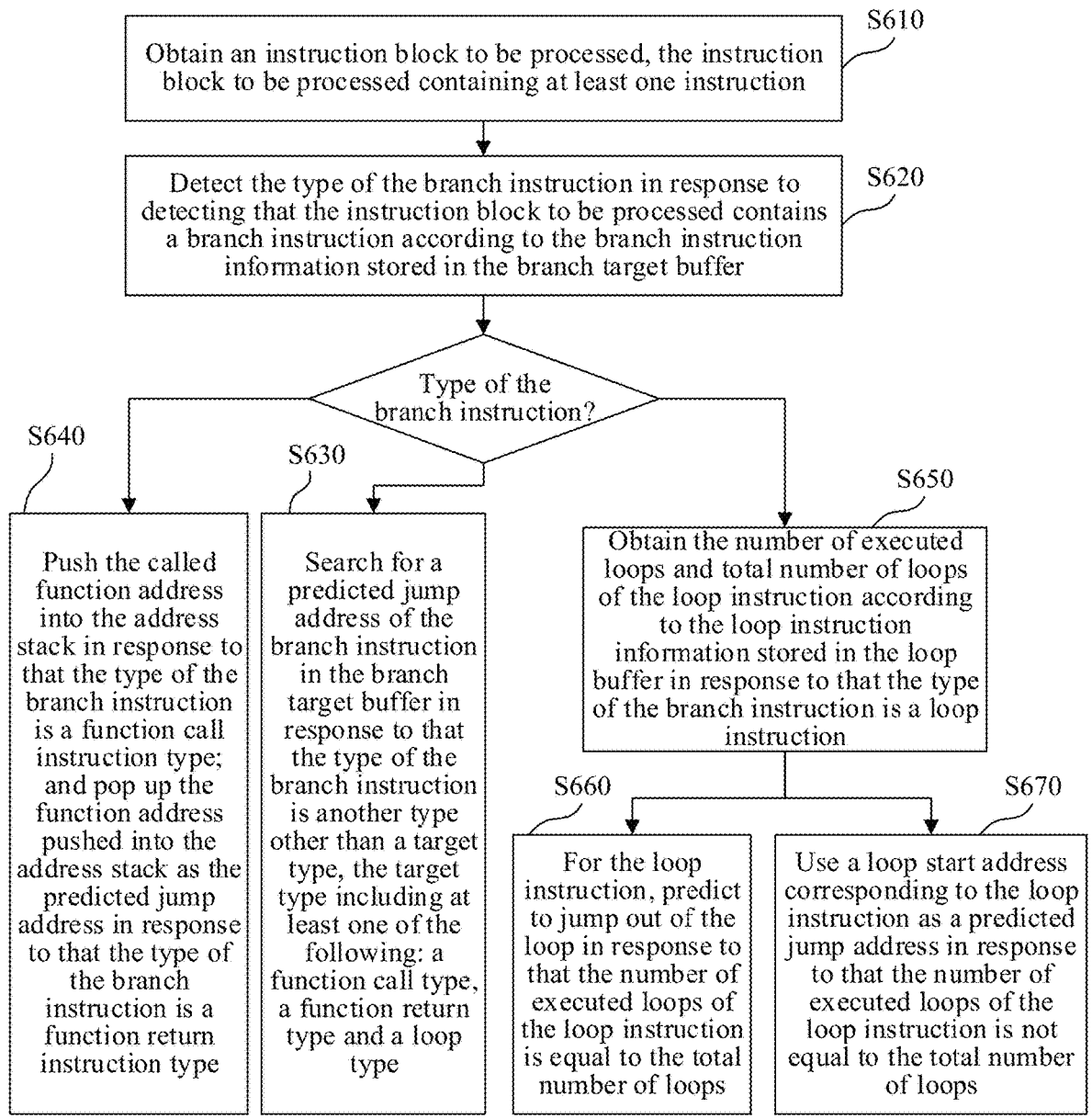
FIG. 6 shows a flowchart of a branch prediction method for a processor according to an embodiment of this application.

In general, as shown in FIG. 6, the branch prediction method for a processor (the branch prediction method for a processor may be performed by a branch predictor, such as the branch predictor 105 shown in FIG. 1) according to an embodiment of this application includes the following steps:

Step S610: Obtain an instruction block to be processed, the instruction block to be processed containing at least one instruction. In some embodiments, the specific implementation details of step S610 are similar to those of step S210 shown in FIG. 2 and will not be repeatedly described.

Step S620: Detect the type of the branch instruction in response to detecting that the instruction block to be processed contains a branch instruction according to the branch instruction information stored in the branch target buffer.

In some embodiments, the specific implementation details of step S620 are similar to those of step S220 shown in FIG. 2 and will not be repeatedly described.

Step S630: Search for a predicted jump address of the branch instruction in the branch target buffer in response to that the type of the branch instruction is another type other than a target type, the target type including at least one of the following: a function call type, a function return instruction type and a loop instruction type. When the type of the instruction is a function call instruction type, the instruction may be referred to as a function call instruction; when the type of the instruction is a function return instruction type, the instruction may be referred to as a function return instruction; and when the type of the instruction is a loop instruction type, the instruction may be referred to as a loop instruction.

In some embodiments, the specific implementation details of step S630 are similar to those of step S230 shown in FIG. 2 and will not be repeatedly described.

Step S640: Push the called function address into the address stack in response to that the type of the branch instruction is a function call instruction type; and pop up the function address pushed into the address stack as the predicted jump address in response to that the type of the branch instruction is a function return instruction type.

In some embodiments, since the function call instruction and the function return instruction usually appear in pairs, as long as the instructions are executed normally, the call and return of the functions thereof will appear in pairs. Therefore, higher prediction accuracy may be provided, and a jump address may be quickly predicted for the function return instruction.

Step S650: Obtain the number of executed loops and total number of loops of the loop instruction according to the loop instruction information stored in the loop buffer in response to that the type of the branch instruction is a loop instruction.

In some embodiments, the specific implementation details of step S650 are similar to those of step S410 shown in FIG. 4 and will not be repeatedly described.

Step S660: For the loop instruction, predict to jump out of the loop in response to that the number of executed loops of the loop instruction is equal to the total number of loops.

In some embodiments, the specific implementation details of step S660 are similar to those of step S420 shown in FIG. 4 and will not be repeatedly described.

Step S670: Use a loop start address corresponding to the loop instruction as a predicted jump address in response to that the number of executed loops of the loop instruction is not equal to the total number of loops.

In some embodiments, the specific implementation details of step S670 are similar to those of step S430 shown in FIG. 4 and will not be repeatedly described.

The implementation details of the technical solutions in the embodiments of this application are described in detail below with reference to FIG. 7 to FIG. 9.

The technical solutions in the embodiments of this application may be applied to the instruction side of an AI cloud reasoning/training processor or a central processing unit (CPU) chip. In particular, targeted designs are made for common instructions in AI processors, which may significantly improve the performance efficiency.

Figures 7, 8, 9:
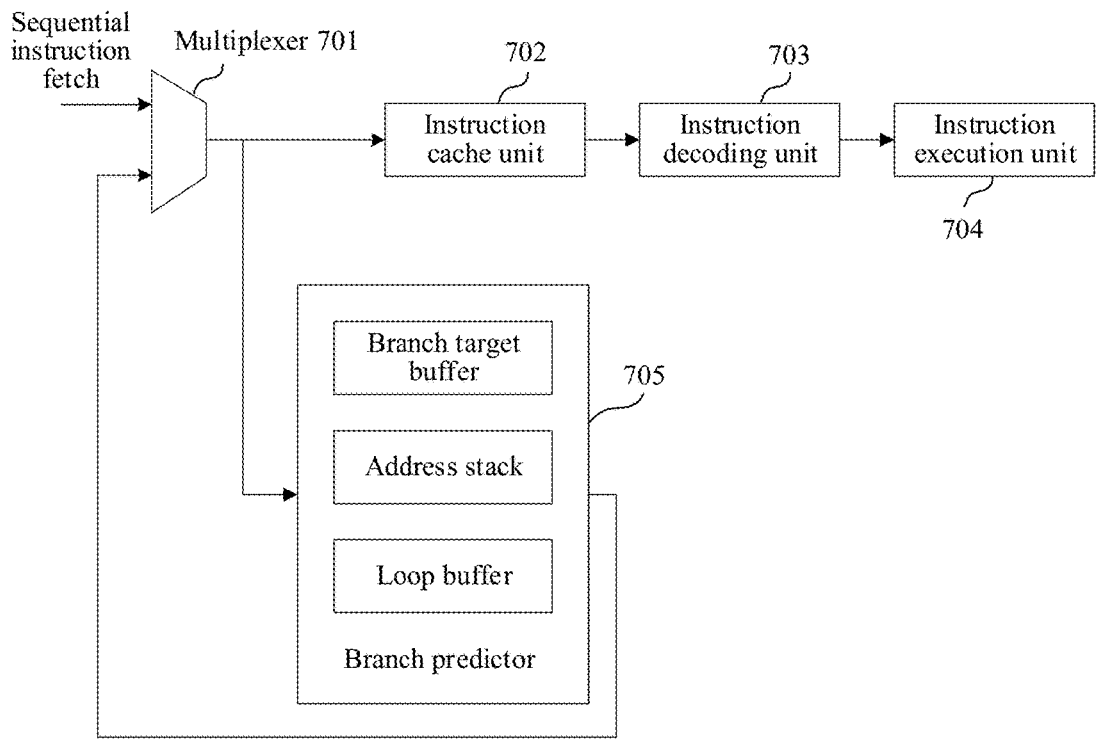
FIG. 7 shows an architecture diagram of a processing apparatus according to an embodiment of this application.
FIG. 8 shows a schematic diagram showing branch instruction information contained in a branch target buffer according to an embodiment of this application.
FIG. 9 shows a schematic diagram showing loop instruction information contained in a loop buffer according to an embodiment of this application.

As one embodiment, as shown in FIG. 7, a processing apparatus includes a multiplexer 701, an instruction cache unit 702, an instruction decoding unit 703, an instruction execution unit 704, and a branch predictor 705. The branch predictor 705 contains a branch target buffer, an address stack for return address, and a loop buffer. In some embodiments, the processing apparatus shown in FIG. 7 may be a processor.

The first input end of the multiplexer 701 is connected to the output end of the branch predictor 705, the second input end of the multiplexer 701 is a sequential instruction fetch end, and the output end of the multiplexer 701 is connected to the input end of the instruction cache unit 702 and the input end of the branch predictor 705. The output end of the instruction cache unit 702 is connected to the input end of the instruction decoding unit 703, and the output end of the instruction decoding unit 703 is connected to the input end of the instruction execution unit 704.

In some embodiments, the multiplexer 701 may output the predicted jump address when the first input end inputs a predicted jump address, and output an instruction address inputted by the second input end (that is, the instruction address obtained in sequence) when the first input end does not input a predicted jump address.

The instruction cache unit 702 is configured to obtain corresponding instruction information according to the address outputted by the multiplexer 701; the instruction decoding unit 703 is configured to decode the instruction information obtained by the instruction cache unit 702 to obtain a control signal; and the instruction execution unit 704 is configured to execute the corresponding operation according to the control signal obtained by the instruction decoding unit 703.

Specifically, the branch predictor 705 provides address prediction of one or more branch instructions executed by the instruction execution unit 704, these addresses may be transmitted to the instruction cache unit 702, and the instruction cache unit 702 searches for instructions at the identified addresses (if a hit to an input address is detected in the instruction cache unit 702, the corresponding instruction may be directly outputted from the instruction cache unit 702; otherwise, the instruction may be requested from a lower-level hierarchical structure of a memory system and may be outputted from the instruction cache unit 702 during search). The instruction fetched from the instruction cache unit 702 is transmitted to the instruction decoding unit 703 and decoded to generate a control signal for controlling the operation of the instruction execution unit 704, thereby achieving the required operation.

The branch predictor 705 may be accessed every time an instruction is fetched to predict the next instruction block to be executed, and the predicted instruction block may include one or more sequential instructions in the memory address space. The predicted instruction block may be identified by the address of the first instruction in the instruction block as a label (the label is the identification information of the instruction), and the number of instructions in the instruction block is usually determined, such as 1, 2, 4, 8, 16, 32, or the like.

The predicted result (such as the predicted jump address) of the branch predictor 705 is outputted by the multiplexer 701 (the other input end of the multiplexer 701 is a sequential instruction fetch end), is provided to the instruction cache unit 702, and is also provided to the branch predictor 705 for a new round of prediction. The purpose of the branch predictor 705 is to predict whether there are branch instructions that are predicted to jump and cause a change in instruction stream (for example, instructions are originally executed according to the running sequence of 1, 2, 3, 4, 5, 6 . . . , but due to the existence of branch instructions, the instruction may jump to another instruction in the middle position for execution, such as 1, 2, 3, 4, 9, 10, or 11). If the predicted instruction block includes one or more such branch instructions, the position of the instruction predicted to be the first to change the instruction stream is identified, and the target address of the instruction is used as the start address of the next instruction block to be predicted. If such branch instruction is not identified in the instruction block, the start address of the next instruction block to be predicted is the sequential address after the last instruction address of the current instruction block.

In the structure shown in FIG. 7, the branch target buffer, the address stack and the loop buffer contained in the branch predictor 705 may be accessed simultaneously. The simultaneous access of the branch target buffer, the address stack and the loop buffer means that: the access to the branch target buffer, the address stack and the loop buffer is completed in a same clock cycle, that is, the access to the branch target buffer, the address stack and the loop buffer may be achieved in a clock cycle. However, during the clock cycle, the access to the branch target buffer, the address stack and the loop buffer may be performed according to a certain sequence. For example, the branch target buffer is accessed first, and after the branch type is determined, the address stack or the loop buffer is accessed according to the determined branch type. Furthermore, it is to be understood that the reason for achieving the access to the branch target buffer, the address stack and the loop buffer in a clock cycle is to complete branch prediction in the same clock cycle that accesses the instruction cache unit, so as to avoid the problem of pipeline flush caused by prediction.

The functions and specific access strategies of the branch target buffer, the address stack and the loop buffer are described in detail below.

The branch target buffer, as a universal branch prediction component, may predict the jump of all types of branch instructions, and the predicted jump target address is directly stored in the entry of the branch target buffer. The specific contents of entries are shown in FIG. 8, including: significant bit, label, branch type, whether to jump, and predicted jump address.

The significant bit is used for representing whether the entry is significant; the label is identification information of a branch instruction, is mainly used for identifying the branch instruction, and may be an address of the instruction; the branch type is the type of a branch instruction, and is used for representing whether the branch instruction is a function call instruction, a function return instruction, a loop instruction, or other types of instructions; and the predicted jump address is used for representing a jump address obtained by prediction for a branch instruction.

In some embodiments, the label and the predicted jump address are generally derived from a part of a program counter (usually a 32-bit binary number).

In some embodiments, for example, an entry in the branch target buffer may specifically include: the value of the "significant bit" field is "1", indicating that the entry is significant; the value of the "label" field is "01111010011101001111101001111010", indicating that the branch instruction is identified by a 32-bit binary number; the value of the "branch type" field is "0", indicating that the branch type is a conditional jump type; the value of the "whether to jump" field is "1", indicating that the jump is needed; and the value of the "predicted jump address" field is "10011011100110111001101110011011", indicating that the predicted jump address is represented by a 32-bit binary number.

During indexed access to an instruction in the branch target buffer, the first step is to check the significant bit in the entry corresponding to the instruction and compare the label in the entry (the label is derived from the address part of the first instruction in the instruction block). If the significant bit of the entry is significant and the comparison of the label passes, it indicates that the current predicted instruction block contains a branch instruction. If the "whether to jump"

field in the entry determines that the branch instruction needs to jump, at this time, the type of the branch instruction is checked. If the type of the branch instruction is a function call instruction, a function return instruction or a loop instruction, the "predicted jump address" in the branch target buffer may not be used, but the address stack or the loop buffer may be referenced to obtain the corresponding predicted jump address. If the type of the branch instruction is not a function call instruction, a function return instruction or a loop instruction, the predicted jump address (the address is derived after the branch instruction is parsed in the instruction execution unit) stored in the entry is used. In some embodiments, in the embodiments of this application, the number of entries contained in the branch target buffer may be within 256, and may also be increased to over 256 through expansion.

The body of the address stack is a stack architecture of LIFO and may be reused to store the function return address and access the pointer at the top of the current stack. Specifically, when encountering a function call instruction, the returned function address (the address is derived after the branch instruction is parsed in the instruction execution unit) will be pushed into the stack; and when encountering a function return instruction, the predicted jump address will be popped out of the stack. When the function call or return is completed, the pointer at the top of the stack is increased or decreased by 1 respectively. The address stack component is specifically used for predicting a function return jump target address. In some embodiments, in the embodiments of this application, the number of entries in the address stack may be within 32, and may also be increased to over 32 through expansion.

In the application of AI processors, the application of loop instructions is very frequent (such as convolution operation), so the loop buffer is a component for specifically predicting whether a loop needs to terminate or continue. The specific contents of entries in the loop buffer are shown in FIG. 9, including: significant bit, label, total number of loops, current number of loops, and loop start address.

The significant bit is used for representing whether the entry is significant; the label is identification information of a loop instruction, is mainly used for identifying the loop instruction, and may be an address of the instruction; the total number of loops is used for representing the total number of loops of the loop body corresponding to the loop instruction; the current number of loops is the number of executed loops, which is used for representing the number of executed loops of the loop body corresponding to the loop instruction; and the loop start address is used for representing the address of the first instruction in the loop body.

In some embodiments, the label and the loop start address are generally derived from a part of a program counter (usually a 32-bit binary number).

In some embodiments, for example, an entry in the loop buffer may specifically include: the value of the "significant bit" field is "1", indicating that the entry is significant; the value of the "label" field is "01111010011101001111101001111010", indicating that the loop instruction is identified by a 32-bit binary number; the value of the "total number of loops" field is "110", indicating that the total number of loops is 6 by the binary system; the value of the "current number of loops" field is "010", indicating that the current number of loops is 2, and also indicating that the loop is not completed; and the value of the "loop start address" field is "10011011100110111001101110011011", indicating that the loop start address is represented by a 32-bit binary number.

During indexed access to an instruction in the loop buffer, the last instruction in the loop body contained in the instruction block is fetched. If the entry corresponding to the last instruction in the loop buffer is significant and the label (the label is derived from the address part of the last instruction in the loop body) matches, the current number of loops and the total number of loops are obtained, and then, the current number of loops is compared with the total number of loops. If the current number of loops is equal to the total number of loops, the loop is predicted to terminate. On the contrary, if the current number of loops is not equal to the total number of loops, it indicates that the loop is not completed. At this time, the loop start address is returned to continue the loop, and the current number of loops in the entry is increased by 1. In other words, when the loop instruction is predicted to terminate, the branch is predicted to jump out of the loop and sequentially fetch the instruction; otherwise, the branch is predicted to jump, and the jump address is the loop start address stored in the entry.

In some embodiments, the number of entries contained in the loop buffer may be determined based on actual application scenarios. When special loop instructions are designed in an ISA and the total number of loops and the length of the loop body may be given, the prediction accuracy of the loop buffer is expected to be 100%.

Visually, the predicted results of the branch predictor in the embodiments of this application are derived from the comprehensive predicted results of three components, namely the branch target buffer, the address stack and the loop buffer, the hardware cost is lower, the implementation is simple and convenient, and the prediction for various types of branch instructions is fully covered. Furthermore, the prediction may be completed in the same clock cycle as accessing the instruction cache unit, thereby avoiding the problem of pipeline flush caused by prediction, being favorable for achieving the prediction effect of "zero bubble" of pipelines, and improving the processing efficiency of the processor. In addition, the embodiments of this application have good universality and will not limit the design of an ISA. In related technologies, branch instructions are often limited during instruction set design, for example, the loop body may not contain branch instructions, the loop body may not be nested, and the like.

The following describes apparatus embodiments of this application, and the apparatus embodiments may be used for performing the branch prediction method for a processor in the foregoing embodiment of this application. For details not disclosed in the apparatus embodiments of this application, reference may be made to the foregoing embodiment of the branch prediction method for a processor in this application.

Figure 10:
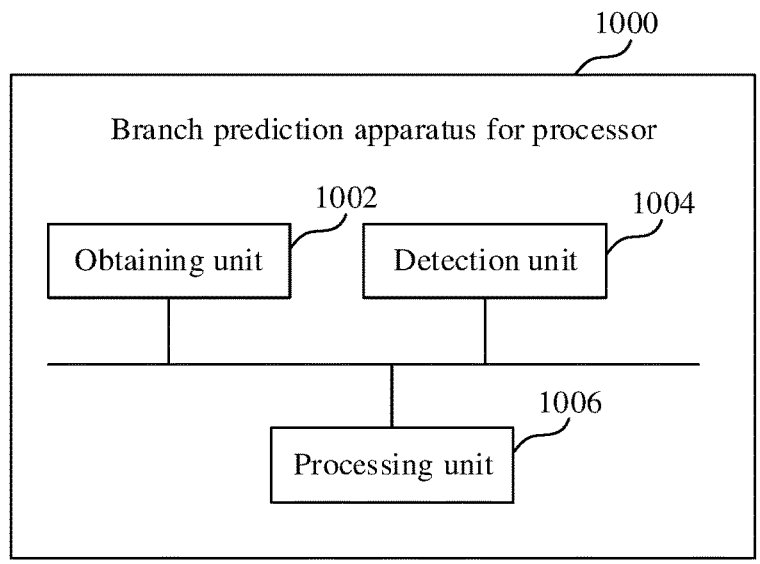
FIG. 10 shows a block diagram of a branch prediction apparatus for a processor according to an embodiment of this application.

FIG. 10 shows a block diagram of a branch prediction apparatus for a processor according to an embodiment of this application. The branch prediction apparatus may be arranged in a branch predictor, and the branch predictor contains a branch target buffer for storing branch instruction information.

Referring to FIG. 10, a branch prediction apparatus 1000 for a processor according to an embodiment of this application includes: an obtaining unit 1002, a detection unit 1004, and a processing unit 1006, where the obtaining unit 1002 is configured to obtain an instruction block to be processed, the instruction block to be processed containing at least one instruction; the detection unit 1004 is configured to perform detection on the instruction block to be processed according to the branch instruction information stored in the branch target buffer, and detect the type of the branch instruction in response to that it is detected that the instruction block to be processed contains a branch instruction; and the processing unit 1006 is configured to search for a predicted jump address of the branch instruction in the branch target buffer in response to that the type of the branch instruction is another type other than a target type, the target type including at least one of the following: a function call instruction type, a function return instruction type and a loop instruction type, and configured to search for a predicted jump address of the branch instruction in other address areas of the branch predictor in response to that the type of the branch instruction is the target type.

In some embodiments of this application, based on the foregoing solution, the branch target buffer contains at least one piece of branch instruction information, and the branch instruction information includes branch instruction identification information, the type of the branch instruction, and the predicted jump address of the branch instruction. The detection unit 1004 is configured to: obtain the identification information of the instruction contained in the instruction block to be processed, and obtain the branch instruction identification information contained in the branch target buffer; and match the identification information of the contained instruction against the contained branch instruction identification information to determine whether the instruction block to be processed contains a branch instruction and the type of the contained branch instruction.

In some embodiments of this application, based on the foregoing solution, the detection unit 1004 is further configured to: match the identification information of the instruction in the instruction block to be processed against the branch instruction identification information contained in the branch target buffer; determine that the instruction is a branch instruction in response to that the branch target buffer contains target branch instruction identification information matching the identification information of the instruction; and obtain target branch instruction information including the target branch instruction identification information in the branch target buffer, and determine the type of the branch instruction according to the type of the branch instruction contained in the target branch instruction information.

In some embodiments of this application, based on the foregoing solution, the detection unit 1004 is further configured to: detect whether the branch instruction needs to jump according to the branch instruction information stored in the branch target buffer in response to that it is detected that the instruction block to be processed contains a branch instruction according to the branch instruction information stored in the branch target buffer; and the processing unit 1006 is configured to perform the operation of searching for a predicted jump address of the branch instruction in response to that it is detected that the branch instruction needs to jump.

In some embodiments of this application, based on the foregoing solution, the other address areas include an address stack for return address, and the target type includes a function call instruction type and a function return instruction type. The processing unit 1006 searches for a predicted jump address of the branch instruction in other address areas of the branch predictor, including: the called function address is pushed into the address stack in response to that the type of the branch instruction is a function call instruction type; and the function address pushed into the address stack is popped up as the predicted jump address in response to that the type of the branch instruction is a function return instruction type.

In some embodiments of this application, based on the foregoing solution, the other address areas include a loop buffer for storing loop instruction information, and the target type includes a loop instruction. The processing unit 1006 searches for a predicted jump address of the branch instruction in other address areas of the branch predictor, including: the number of executed loops and total number of loops of the branch instruction are obtained according to the loop instruction information stored in the loop buffer in response to that the type of the branch instruction is a loop instruction type; and for the branch instruction, it is predicted to jump out of the loop in response to that the number of executed loops of the branch instruction is equal to the total number of loops.

In some embodiments of this application, based on the foregoing solution, the processing unit 1006 is further configured to: use a loop start address corresponding to the loop instruction as a predicted jump address in response to that the number of executed loops of the loop instruction is not equal to the total number of loops.

In some embodiments of this application, based on the foregoing solution, the loop buffer contains at least one piece of loop instruction information, and the loop instruction information includes loop instruction identification information, a total number of loops and a number of executed loops. The processing unit 1006 is configured to: fetch a specified instruction in a loop body corresponding to the branch instruction; match identification information of the specified instruction against the loop instruction identification information in the loop buffer to determine target loop instruction information matching the identification information of the specified instruction; and query the number of executed loops and total number of loops of the branch instruction according to the target loop instruction information.

In some embodiments of this application, based on the foregoing solution, the specified position is the position of the last instruction in the loop body.

In some embodiments of this application, based on the foregoing solution, the specified instruction includes the last instruction in the loop body.

In some embodiments of this application, based on the foregoing solution, the processing unit 1006 is further configured to: increase the number of executed loops of the target loop instruction information by a set value in response to that the number of executed loops of the branch instruction is not equal to the total number of loops.

In some embodiments of this application, based on the foregoing solution, the prediction process of the branch prediction method and the instruction fetch process of the processor are in a same clock cycle.

In some embodiments of this application, based on the foregoing solution, the processing unit 1006 is further configured to: use a predicted jump address of the branch instruction as a start address of the next instruction block to be processed in response to that it is detected that the instruction block to be processed contains a branch instruction according to the branch instruction information stored in the branch target buffer.

In some embodiments of this application, based on the foregoing solution, the processing unit 1006 is further configured to: use a sequential address after the last instruction address of the instruction block to be processed as a start address of the next instruction block to be processed in response to that it is detected that the instruction block to be processed does not contain a branch instruction according to the branch instruction information stored in the branch target buffer.

Figure 11:
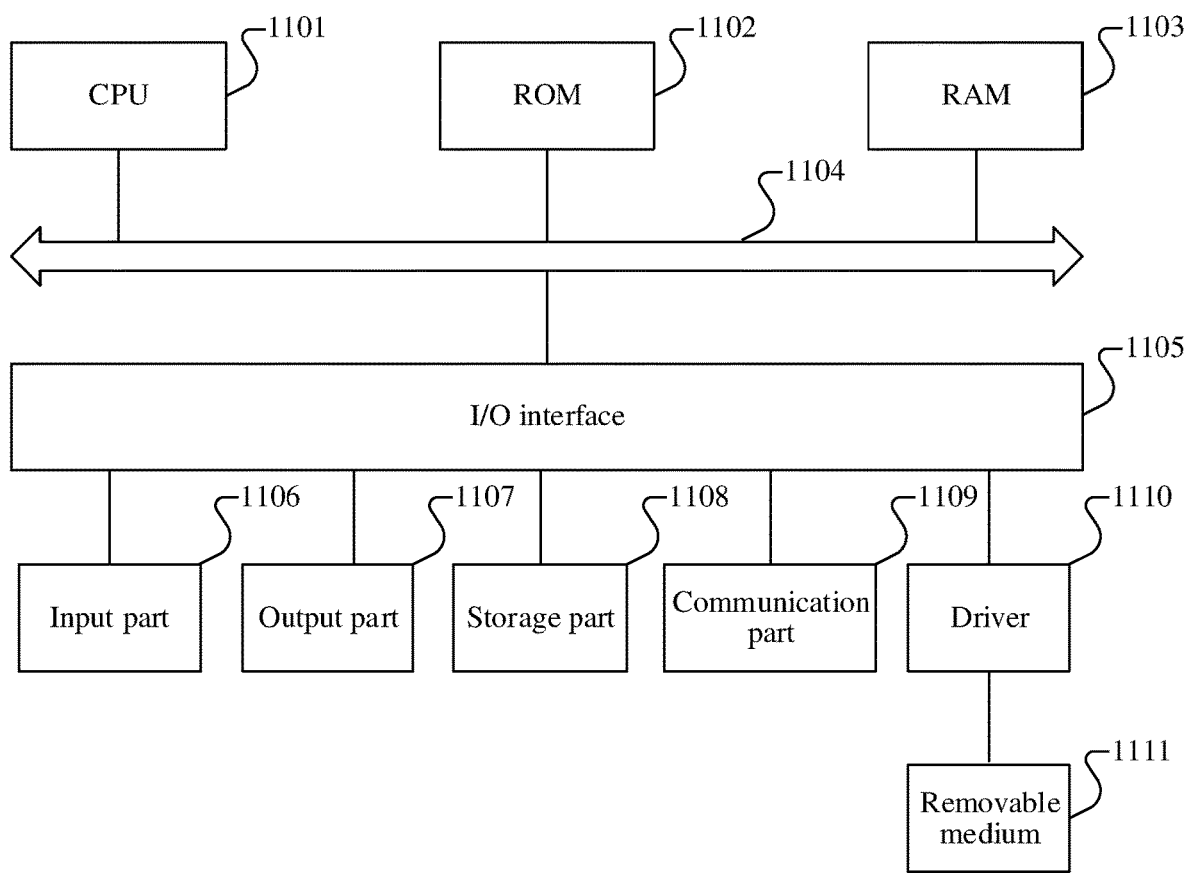
FIG. 11 shows a schematic structural diagram of a computer system adapted to implement an electronic device according to an embodiment of this application.

FIG. 11 shows a schematic structural diagram of a computer system adapted to implement an electronic device according to an embodiment of this application.

It is to be understood that a computer system 1100 of an electronic device shown in FIG. 11 is merely an example, and does not constitute any limitation on functions and use ranges of the embodiments of this application.

As shown in FIG. 11, the computer system 1100 includes a central processing unit (CPU) 1101, which may perform various suitable actions and processing based on a program stored in a read-only memory (ROM) 1102 or a program loaded from a storage part 1108 into a random access memory (RAM) 1103, for example, perform the method described in the foregoing embodiments. The RAM 1103 further stores various programs and data required for system operations. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard, a mouse, or the like; an output part 1107 including a cathode ray tube (CRT), a liquid crystal display (LCD), a speaker, or the like; a storage part 1108 including a hard disk, or the like; and a communication part 1109 including a network interface card such as a local area network (LAN) card or a modem. The communication part 1109 performs communication processing by using a network such as the Internet. A driver 1110 is also connected to the I/O interface 1105 as required. A removable medium 1111, such as a magnetic disk, an optical disk, a magneto-optical disk, or a semiconductor memory, is installed on the driver 1110 as required, so that a computer program read from the removable medium is installed into the storage part 1108 as required.

Particularly, according to the embodiments of this application, the processes described above by referring to the flowcharts may be implemented as computer software programs. For example, an embodiment of this application includes a computer program product. The computer program product includes a computer program carried on a computer-readable medium. The computer program includes a computer program used for performing a method shown in the flowchart. In such an embodiment, the computer program may be downloaded and installed from a network through the communication part 1109, and/or installed from the removable medium 1111. When the computer program is executed by the CPU 1101, various functions defined in the system of this application are executed.

It is to be understood that the computer-readable medium shown in the embodiments of this application may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or device, or any combination of the above. A more specific example of the computer-readable storage medium may include but is not limited to: an electrical connector having one or more wires, a portable computer disk, a hard disk, an RAM, an ROM, an erasable programmable read only memory (EPROM), a flash memory, an optical fiber, a portable compact disc read-only memory (CD-ROM), an optical storage device, a magnetic storage device, or any suitable combination thereof. In this application, the computer-readable storage medium may be any tangible medium containing or storing a program, and the program may be used by or used in combination with an instruction execution system, an apparatus, or a device. In this application, the computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in combination with an instruction execution system, an apparatus, or a device. The computer program included in the computer-readable medium may be transmitted by any suitable medium, including but not limited to: a wireless medium, a wired medium, or any suitable combination thereof.

The flowcharts and block diagrams in the accompanying drawings illustrate possible system architectures, functions and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described may also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not assembled in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions in the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the implementations of the present disclosure, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application.

It is to be understood that this application is not limited to the precise structures described above and shown in the accompanying drawings, and various modifications and changes can be made without departing from the scope of this application. The scope of this application is only subject to the appended claims.

What is claimed is:

1. A branch prediction method comprising:
   obtaining an instruction block containing an instruction;
   performing detection on the instruction block according to branch instruction information stored in a branch target buffer of a branch predictor of a processor;
   in response to detecting that the instruction contained in the instruction block is a branch instruction, detecting a type of the branch instruction; and
   searching for a predicted jump address of the branch instruction according to the type of the branch instruction, including:
      in response to the type of a first branch instruction being a type other than a target type, searching for the predicted jump address of the first branch instruction in the branch target buffer, the target type including at least one of a function call instruction type, a function return instruction type, or a loop instruction type;
      in response to the type of a second branch instruction being the function call instruction type, pushing an address of a function called by the second branch instruction into a target address stack;
      in response to the type of a third branch instruction being a function return instruction type, popping up an address of a second function previously pushed into the target address stack as a predicted jump address of the third branch instruction; and
      in response to the type of a fourth branch instruction being a loop instruction type, obtaining a number of executed loops and a total number of loops of the fourth branch instruction according to loop instruction information stored in a loop buffer, and predicting to jump out of a current loop for the fourth branch instruction in response to the number of executed loops being equal to the total number of loops,
   wherein the branch target buffer, the target address stack, and the loop buffer are configured to be accessed simultaneously in a same clock cycle.

2. The branch prediction method according to claim 1, wherein:
   the branch instruction information includes branch instruction identification information; and
   performing detection on the instruction block and detecting the type of the branch instruction include:
      obtaining identification information of the instruction contained in the instruction block, and obtaining the branch instruction identification information contained in the branch target buffer; and
      matching the identification information of the instruction against the branch instruction identification information to determine whether the instruction block contains the branch instruction and the type of the branch instruction.

3. The method according to claim 2, wherein:
   the branch instruction information includes the type of the branch instruction; and
   matching the identification information of the instruction against the branch instruction identification information to determine whether the instruction block contains the branch instruction and the type of the branch instruction includes:
      matching the identification information of the instruction in the instruction block against the branch instruction identification information contained in the branch target buffer;
      in response to the branch target buffer containing target branch instruction identification information matching the identification information of the instruction, determining that the instruction is the branch instruction; and
      obtaining target branch instruction information, in the branch target buffer, that includes the target branch instruction identification information, and determining the type of the branch instruction according to a type of a branch instruction contained in the target branch instruction information.

4. The branch prediction method according to claim 1, further comprising:
   in response to detecting that the instruction block contains the branch instruction according to the branch instruction information stored in the branch target buffer, detecting whether the branch instruction needs to jump according to the branch instruction information stored in the branch target buffer;
   wherein searching for the predicted jump address includes searching for the predicted jump address in response to detecting that the branch instruction needs to jump.

5. The branch prediction method according to claim 1, wherein searching for the predicted jump address of the fourth branch instruction in the other address areas of the branch predictor further includes:
   in response to the number of executed loops being not equal to the total number of loops, setting a loop start address corresponding to the fourth branch instruction as the predicted jump address.

6. The branch prediction method according to claim 1, wherein obtaining the number of executed loops and the total number of loops includes:
   fetching a specified instruction in a loop body corresponding to the fourth branch instruction;
   matching identification information of the specified instruction against loop instruction identification information in the loop buffer to determine target loop instruction information matching the identification information of the specified instruction; and querying to obtain the number of executed loops and the total number of loops of the fourth branch instruction according to the target loop instruction information.

7. The branch prediction method according to claim 6, wherein the specified instruction includes an instruction at a specified position in the loop body.

8. The branch prediction method according to claim 7, wherein the specified position is a position of a last instruction in the loop body.

9. The branch prediction method according to claim 6, further comprising:

in response to the number of executed loops being not equal to the total number of loops, increasing a number of executed loops of the target loop instruction information by a set value.

10. The branch prediction method according to claim 1, wherein the searching for the predicted jump address of the branch instruction and an instruction fetch process of the processor are performed in a same clock cycle.

11. The branch prediction method according to claim 1, further comprising:

in response to detecting that the instruction block contains the branch instruction according to branch instruction information stored in the branch target buffer, setting the predicted jump address of the branch instruction as a start address of a next instruction block to be processed.

12. The branch prediction method according to claim 11, further comprising:

in response to detecting that the instruction block does not contain the branch instruction according to the branch instruction information stored in the branch target buffer, setting a sequential address after a last instruction address of the instruction block as the start address of the next instruction block to be processed.

13. A branch predictor arranged in a processor, and configured to implement the branch prediction method according to claim 1.

14. A processor comprising:

the branch predictor according to claim 13;

a multiplexer, a first input end of the branch predictor being connected to an output end of the branch predictor, a second input end of the multiplexer being a sequential instruction fetch end, an output end of the multiplexer being connected to an input end of the branch predictor, and the multiplexer being configured to:

output the predicted jump address in response to the first input end receiving the predicted jump address; and output an instruction address received at the second input end in response to the first input end not receiving the predicted jump address;

an instruction cache unit, an input end of the instruction cache unit being connected to the output end of the multiplexer, and the instruction cache unit being configured to obtain corresponding instruction information according to an address outputted by the multiplexer;

an instruction decoding unit connected to the instruction cache unit and configured to decode the instruction information obtained by the instruction cache unit to obtain a control signal; and an instruction execution unit connected to the instruction decoding unit and configured to execute a corresponding operation according to the control signal.

15. A non-transitory computer-readable medium, storing a computer program that, when executed by one or more processors, causes the one or more processors to:

obtain an instruction block containing an instruction;

perform detection on the instruction block according to branch instruction information stored in a branch target buffer of a branch predictor;

in response to detecting that the instruction contained in the instruction block is a branch instruction, detect a type of the branch instruction; and search for a predicted jump address of the branch instruction according to the type of the branch instruction, including:

in response to the type of the branch instruction being a type other than a target type, searching for the predicted jump address of the branch instruction in the branch target buffer, the target type including at least one of a function call instruction type, a function return instruction type, or a loop instruction type; and in response to the type of a second branch instruction being the function call instruction type, pushing an address of a function called by the second branch instruction into a target address stack;

in response to the type of a third branch instruction being a function return instruction type, popping up an address of a second function previously pushed into the target address stack as a predicted jump address of the third branch instruction; and in response to the type of a fourth branch instruction being a loop instruction type, obtaining a number of executed loops and a total number of loops of the fourth branch instruction according to loop instruction information stored in a loop buffer, and predicting to jump out of a current loop for the fourth branch instruction in response to the number of executed loops being equal to the total number of loops, wherein the branch target buffer, the target address stack, and the loop buffer are configured to be accessed simultaneously in a same clock cycle.

16. An electronic device comprising:

one or more processors; and a storage apparatus storing one or more programs that, when executed by the one or more processors, cause the one or more processors to:

obtain an instruction block containing an instruction;

perform detection on the instruction block according to branch instruction information stored in a branch target buffer of a branch predictor;

in response to detecting that the instruction contained in the instruction block is a branch instruction, detect a type of the branch instruction; and search for a predicted jump address of the branch instruction according to the type of the branch instruction, including:

in response to the type of the branch instruction being a type other than a target type, searching for the predicted jump address of the branch instruction in the branch target buffer, the target type including at least one of a function call instruction type, a function return instruction type, or a loop instruction type; and in response to the type of a second branch instruction being the function call instruction type, pushing an address of a function called by the second branch instruction into a target address stack;

in response to the type of a third branch instruction being a function return instruction type, popping up an address of a second function previously pushed into the target address stack as a predicted jump address of the third branch instruction; and in response to the type of a fourth branch instruction being a loop instruction type, obtaining a number of executed loops and a total number of loops of the fourth branch instruction according to loop instruction information stored in a loop buffer, and predicting to jump out of a current loop for the fourth branch instruction in response to the number of executed loops being equal to the total number of loops, wherein the branch target buffer, the target address stack, and the loop buffer are configured to be accessed simultaneously in a same clock cycle.

17. The electronic device according to claim 16, wherein:
the branch instruction information includes branch instruction identification information; and
the one or more programs further cause the one or more processors to:
 obtain identification information of the instruction contained in the instruction block, and obtain the branch instruction identification information contained in the branch target buffer; and
 match the identification information of the instruction against the branch instruction identification information to determine whether the instruction block contains the branch instruction and the type of the branch instruction.

18. The electronic device according to claim 17, wherein:
the branch instruction information includes the type of the branch instruction; and
the one or more programs further cause the one or more processors to:
 match the identification information of the instruction in the instruction block against the branch instruction identification information contained in the branch target buffer;
 in response to the branch target buffer containing target branch instruction identification information matching the identification information of the instruction, determine that the instruction is the branch instruction; and
 obtain target branch instruction information, in the branch target buffer, which includes the target branch instruction identification information, and determine the type of the branch instruction according to a type of a branch instruction contained in the target branch instruction information.

* * * * *